United States Patent
Hong

(10) Patent No.: US 11,812,478 B2
(45) Date of Patent: *Nov. 7, 2023

(54) NETWORK ACCESS METHOD AND APPARATUS

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 306 days.

This patent is subject to a terminal disclaimer.

(21) Appl. No.: 17/277,568

(22) PCT Filed: Sep. 29, 2018

(86) PCT No.: PCT/CN2018/108783
§ 371 (c)(1),
(2) Date: Mar. 18, 2021

(87) PCT Pub. No.: WO2020/062167
PCT Pub. Date: Apr. 2, 2020

(65) Prior Publication Data
US 2021/0352736 A1 Nov. 11, 2021

(51) Int. Cl.
*H04W 4/00* (2018.01)
*H04W 74/08* (2009.01)
(Continued)

(52) U.S. Cl.
CPC ......... *H04W 74/0841* (2013.01); *H04W 4/70* (2018.02); *H04W 12/0431* (2021.01); *H04W 28/0268* (2013.01)

(58) Field of Classification Search
CPC ............... H04W 74/0841; H04W 4/70; H04W 12/0431; H04W 28/0268
(Continued)

(56) References Cited

U.S. PATENT DOCUMENTS

2013/0089001 A1* 4/2013 Dattagupta ........... H04W 48/20
370/255
2013/0303166 A1* 11/2013 Jain ........................ H04B 7/065
455/435.2
(Continued)

FOREIGN PATENT DOCUMENTS

CN 103716789 A 4/2014
CN 203786547 U 8/2014
(Continued)

OTHER PUBLICATIONS

International Search Report and Written Opinion dated May 29, 2019 in PCT/CN2018/108783 filed Sep. 29, 2018, 2 pages.
(Continued)

*Primary Examiner* — Mark G. Pannell
(74) *Attorney, Agent, or Firm* — Oblon, McClelland, Maier & Neustadt, L.L.P.

(57) ABSTRACT

The method includes that, in response to a device-to-device (D2D) communication connection being established between a smart home device and a terminal, the terminal receives access requirement information sent by the smart home device. Further, the terminal determines a target base station based on the access requirement information and sends access information for accessing the target base station to the smart home device. The smart home device initiates random access to the target base station based on the access information, such that the smart home device accesses a cellular mobile network.

20 Claims, 7 Drawing Sheets

(51) Int. Cl.
*H04W 4/70* (2018.01)
*H04W 12/0431* (2021.01)
*H04W 28/02* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2014/0192733 | A1* | 7/2014 | Charbit | H04L 5/0053 |
| | | | | 370/329 |
| 2014/0220970 | A1* | 8/2014 | Yang | H04W 48/20 |
| | | | | 455/434 |
| 2014/0314048 | A1* | 10/2014 | Yi | H04W 4/70 |
| | | | | 370/332 |
| 2015/0271746 | A1* | 9/2015 | Jang | H04W 48/18 |
| | | | | 370/328 |
| 2016/0227582 | A1* | 8/2016 | Vajapeyam | H04W 74/008 |
| 2018/0070282 | A1* | 3/2018 | Su | H04L 1/0001 |
| 2018/0101673 | A1* | 4/2018 | Zhang | G06F 21/36 |
| 2019/0166553 | A1* | 5/2019 | Ryoo | H04W 76/28 |
| 2021/0377067 | A1* | 12/2021 | Hong | H04W 4/80 |

FOREIGN PATENT DOCUMENTS

| | | |
|---|---|---|
| CN | 104684042 A | 6/2015 |
| CN | 105263175 A | 1/2016 |
| CN | 105636158 A | 6/2016 |
| CN | 105898814 A | 8/2016 |
| CN | 106341860 A | 1/2017 |
| CN | 106604356 A | 4/2017 |
| CN | 107634886 A | 1/2018 |
| CN | 108601061 A | 9/2018 |
| WO | WO 2016/127551 A1 | 8/2016 |

OTHER PUBLICATIONS

Chinese First Office Action dated Jul. 17, 2020 in Chinese Patent Application No. 201880001530.4 filed Sep. 29, 2018, 19 pages (with English Translation).

Chinese Second Office Action dated Feb. 22, 2021 in Chinese Patent Application No. 201880001530.4 filed Sept. 29, 2018, 6 pages (with Translation of Category of Cited Documents).

* cited by examiner

NETWORK ACCESS METHOD AND APPARATUS

CROSS-REFERENCE TO RELATED APPLICATION

This application is a national phase application based on PCT/CN2018/108783, filed on Sep. 29, 2018, the content of which is incorporated herein by reference.

TECHNICAL FIELD

The present disclosure relates to the technical field of smart homes, including a network access method, a network access apparatus, and a storage medium.

BACKGROUND

With the continuous development of network technology, more and more smart home devices have Internet access functions, so as to interact with servers or other devices over the Internet.

SUMMARY

Embodiments of the present disclosure can provide a network access method, a network access apparatus, and a storage medium.

According to a first aspect of the disclosure, a network access method is provided. The network access method can include establishing a device-to-device (D2D) communication connection between a terminal and a smart home device, and sending, by the smart home device, access requirement information to the terminal over the D2D communication connection, wherein the access requirement information indicates a condition to be satisfied by a base station to be accessed by the smart home device. The method can further include determining, by the terminal, a target base station based on the access requirement information, acquiring, by the terminal, access information for accessing the target base station, sending, by the terminal, the access information to the smart home device over the D2D communication connection, and initiating, by the smart home device, random access to the target base station based on the access information.

According to a second aspect of the disclosure, a network access method is provided. The network access method is applicable to a smart home device. The method can include establishing a device-to-device (D2D) communication connection with a terminal, and sending access requirement information to the terminal over the D2D communication connection, wherein the access requirement information indicates a condition to be satisfied by a base station to be accessed by the smart home device. The method can further include receiving access information sent by the terminal over the D2D communication connection, wherein the access information is intended for accessing a target base station, the target base station being a base station determined by the terminal based on the access requirement information, and initiating random access to the target base station based on the access information.

According to a third aspect of the disclosure, a network access method is provided.

The network access method is applicable to a terminal, and the method can include establishing a device-to-device (D2D) communication connection with a smart home device, and receiving access requirement information sent by the smart home device over the D2D communication connection, wherein the access requirement information indicates a condition to be satisfied by a base station to be accessed by the smart home device. The method can further include determining a target base station based on the access requirement information, acquiring access information for accessing the target base station, and sending the access information to the smart home device over the D2D communication connection, such that the smart home device initiates random access to the target base station based on the access information.

According to a fourth aspect of the disclosure, a network access apparatus is provided. The network access apparatus is applicable to a smart home device, and the apparatus includes a processor and a memory for storing at least one instruction executable by the processor. The processor can be configured to perform a network access method as defined in the second aspect.

According to a fifth aspect of the disclosure, a network access apparatus is provided. The network access apparatus is applicable to a terminal, and the apparatus includes a processor and a memory for storing at least one instruction executable by the processor. When the at least one instruction is executed by the processor, the processor can perform a network access method as defined in the third aspect.

According to an eighth aspect of the disclosure, a network access system is provided. The network access system includes a smart home device and a terminal. The smart home device includes a network access apparatus having a processor and a memory for storing at least one instruction executable by the processor. When the at least one instruction, is executed by the processor, the processor can perform a network access method. The method can include stablishing a device-to-device (D2D) communication connection with a terminal, and sending access requirement information to the terminal over the D2D communication connection, wherein the access requirement information indicates a condition to be satisfied by a base station to be accessed by the smart home device. The method can further include receiving access information sent by the terminal over the D2D communication connection, wherein the access information is intended for accessing a target base station, the target base station being a base station determined by the terminal based on the access requirement information, and initiating random access to the target base station based on the access information, and the terminal includes the network access apparatus as defined in the fifth aspect.

It should be understood that the above general description and the following detailed description are only exemplary and explanatory, and do not limit the present disclosure.

BRIEF DESCRIPTION OF THE DRAWINGS

The drawings herein are incorporated into the specification and constitute a part of the specification, illustrate embodiments consistent with the present disclosure, and are used in conjunction with the specification to explain the principle of the present disclosure.

DETAILED DESCRIPTION

Figure 1:
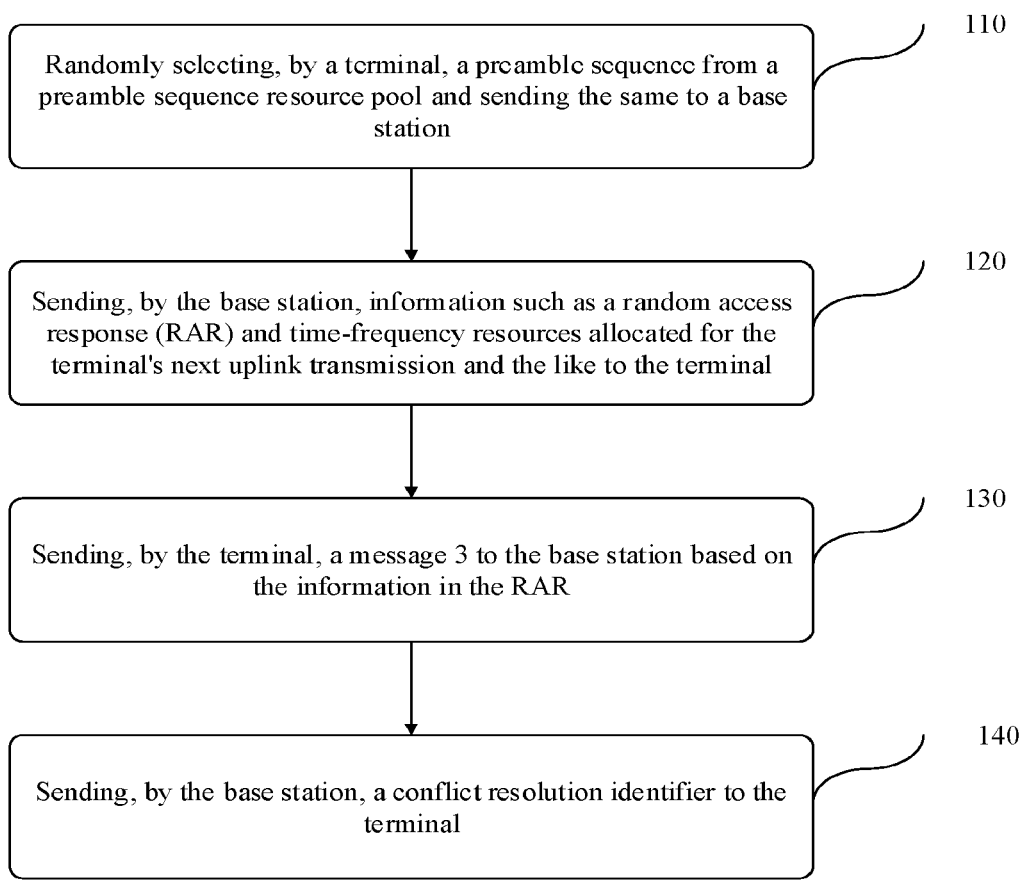
FIG. 1 is a schematic diagram of a random access process according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

It shall be understood that, although the terms "first," "second," "third," and the like may be used herein to describe various information, the information should not be limited by these terms. These terms are only used to distinguish one category of information from another. For example, without departing from the scope of the present disclosure, first type may be referred as second type; and similarly, second type may also be referred as first type. As used herein, the term "if" may be interpreted as "when" or "upon" or "in response to determining" depending on the context.

Smart home devices usually access the Internet over a wireless local area network (WLAN). For example, the smart home device searches for a wireless access point (such as a router or a terminal which turns on a function of wireless hotspot) of the surrounding wireless local area network, and initiates a connection request to the wireless access point, so as to establish a Wi-Fi connection with the wireless access point. When the connection is successful, and the wireless local area network accessible by the wireless access point accesses the Internet, the smart home device can exchange information with the Internet side through the wireless access point.

The solution according to the present disclosure may be applied in a scenario in which a smart home device establishes a wireless connection with a network in daily life, and for ease of understanding, some terms related to the embodiments of the present disclosure are briefly introduced in the following.

Device to device (D2D) communication, also known as proximity service (ProSe), is a wireless communication technology proposed by the 3rd generation partnership project (3GPP) organization. Under the control of a cellular communication system, communications between fifth-generation (5G) or long term evolution (LTE) terminals and terminals, between terminals and devices, and between devices and devices may be allowed by using cell wireless resources and relay over a cellular network is not required.

That is to say, D2D communication may coexist with cellular communication in a cell, and two devices communicating over D2D directly communicate with each other by reusing cell resources, and do not pass through a base station. In a 3GPP system, ProSe technology may be divided into two parts: proximity discovery and proximity communication. Proximity discovery includes direct discovery and evolved packet core (EPC) level discovery. Proximity communication includes one-to-one, one-to-many, and relay communications and the like.

Random access refers to a process in cellular mobile communications in which in response to a terminal being synchronized with a base station/cell, the terminal sends a random access preamble and then attempts to connect to the base station to establish a basic signaling connection with the base station.

Before the random access process starts, the base station sends configuration information of the random access process to the terminal, and the terminal performs the random access process based on the received configuration information. Specifically, the random access process is generally divided into a contention-based random access process and a non-contention-based random access process. Taking a contention-based random access process as an example, FIG. 1 shows a schematic diagram of a random access process according to an exemplary embodiment of the present disclosure.

In step 110, a terminal randomly selects a preamble sequence (also called a preamble) from a preamble sequence resource pool and sends the same to a base station. A message containing the preamble is also called message 1 (Msg1). The base station performs correlation detection on a received signal, thereby identifying the preamble sequence sent by a user.

In step 120, the base station sends a random access response (RAR) to the terminal. The RAR is also called message 2 (Msg2). The RAR contains a random access preamble sequence identifier, a timing advance instruction determined by a time delay estimation between the terminal and the base station, a temporary cell-radio network temporary identifier (TC-RNTI), and time-frequency resources allocated for the terminal's next uplink transmission and the like.

In step 130, the terminal sends a message 3 (Msg3) to the base station based on the information in the RAR. The Msg3 contains information such as a terminal identifier and a radio resource control (RRC) link request and the like. The terminal identifier may be a unique identifier corresponding to the terminal.

In step 140, the base station sends a conflict resolution identifier (also referred to as Msg4) to the terminal, including an identifier of a terminal that wins in the conflict resolution. Upon detecting its own identifier, the terminal upgrades TC-RNTI to a cell-radio network temporary identifier (C-RNTI), sends an acknowledgement (ACK) signal to the base station to complete random access process, and waits for scheduling by the base station.

It should be noted that in the above step 120, the random access response is sent over a physical downlink shared channel between the terminal and the base station. During the sending process, the base station scrambles a physical downlink control channel corresponding to the physical downlink shared channel by using a random access-radio network temporary identity (RA-RNTI). The RA-RNTI corresponds to time-frequency resources occupied by the preamble sequence detected by the base station. In this case, the terminal may calculate a corresponding RA-RNTI and use the RA-RNTI to descramble the physical downlink control channel, thereby further detecting the random access response.

For a non-contention-based random access process, since the base station knows the terminal identifier, it may allocate a preamble sequence to the terminal. Therefore, when sending the preamble sequence, the terminal does not need to randomly select the sequence, but may use the preamble sequence allocated by the base station. Upon detecting the allocated preamble sequence, the base station may send a corresponding random access response, including information such as timing advance and uplink resource allocation and the like. Upon receiving the random access response, the terminal may consider that the access has been completed and wait for further scheduling by the base station. Therefore, the non-contention-based random access process may only include two steps, that is, a step 110 of sending a preamble sequence and a step 120 of sending a random access response.

Figure 2:
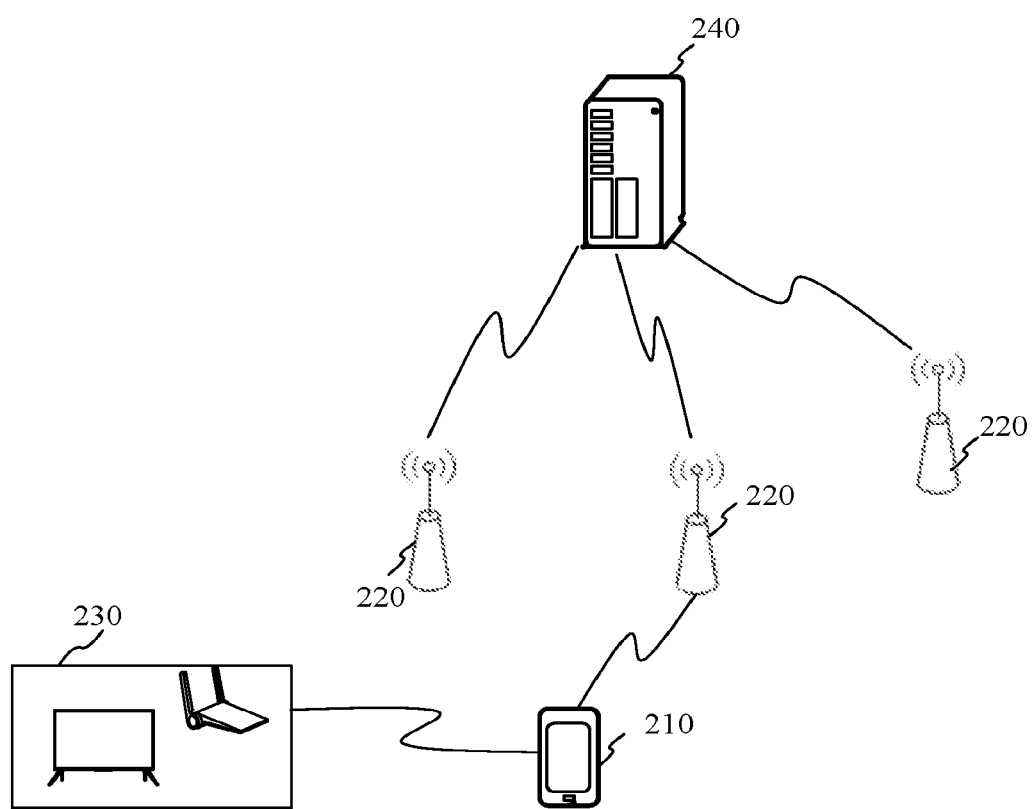
FIG. 2 is a schematic structural diagram of a smart home device network connection according to an exemplary embodiment of the present disclosure.

FIG. 2 shows a schematic structural diagram of a smart home device network connection according to an exemplary embodiment of the present disclosure. As shown in FIG. 2, a terminal 210, a plurality of base stations 220, and a plurality of smart home devices 230 are included.

The terminal 210 is a terminal with cellular mobile communication capabilities. The terminal 210 may communicate with one or more core networks over a radio access network (RAN). The terminal 210 may be a mobile terminal, such as a mobile phone (or called "cellular" phone) and a computer with a mobile terminal. For example, it may be a portable, pocket-sized, handheld, computer built-in or vehicle-mounted mobile device, such as a station (STA), a subscriber unit, a subscriber station, a mobile station, a mobile stage, a remote station, an access point, a remote terminal, an access terminal, a user terminal, a user agent, a user device, or a user equipment (UE). Alternatively, the terminal 210 may also be a device of an unmanned aerial vehicle.

The base station 220 may be a network-side device in a wireless communication system. The wireless communication system may be the 4th generation mobile communication (4G) system, also known as a long-term evolution system. Alternatively, the wireless communication system may also be a 5G system, also known as a new radio (NR) system. Alternatively, the wireless communication system may also be a next-generation system of the 5G system.

The base station 220 may be an evolutional NodeB (eNB) used in the 4G system. Alternatively, the base station 220 may also be a next generation NodeB (gNB) adopting a centralized distributed architecture in the 5G system. When the base station 220 adopts a centralized distributed architecture, it may usually include a central unit (CU) and at least two distributed units (DU). The central unit may be provided with a protocol stack of a packet data convergence protocol (PDCP) layer, a radio link control (RLC) layer, and a media access control (MAC) layer. The distributed unit is provided with a protocol stack of a physical (PHY) layer. The specific implementation of the base station 220 is not limited in the embodiment of the present disclosure.

A wireless connection may be established between the base station 220 and the terminal 210 through a wireless air interface. In different embodiments, the wireless air interface is a wireless air interface based on the fourth-generation mobile communication network technology (4G) standard. Alternatively, the wireless air interface is a wireless air interface based on the fifth-generation mobile communication network technology (5G) standard. For example, the wireless air interface is a new air interface. Alternatively, the wireless air interface may also be a wireless air interface based on 5G-based next-generation mobile communication network technology standard.

Optionally, the above-mentioned wireless communication system may further include a network management device 240. The plurality of base stations 220 are respectively connected to the network management device 240. The network management device 240 may be a core network device in the wireless communication system. For example, the network management device 240 may be a mobility management entity (MME) in the EPC. Alternatively, the network management device may also be another core network device, such as a serving gateway (SGW), a public data network gateway (PGW), a policy and charging rules function unit (PCRF) or a home subscriber server (HSS) and the like. The implementation of the network management device 240 is not limited in the embodiment of the present disclosure.

The smart home device 230 may include, but is not limited to, fixedly installed devices or devices movable within a small range such as cameras, sensors (such as infrared sensors, light sensors, vibration sensors, and sound sensors and the like), smart TVs, smart robots, smart speakers, smart refrigerators, smart air conditioners, smart rice cookers, and water purifiers. Alternatively, the smart home device 230 may also be a moving picture experts group audio layer III (MP3) player, a moving picture experts group audio layer IV (MP4) player, a smart Bluetooth headset or other mobile device.

Information exchange between the smart home device 230 and the network may be realized by establishing a Wi-Fi connection between the smart home device 230 and a WLAN wireless access point (such as a router or a terminal 210 which turns on a wireless hotspot function). Due to poor stability of the Wi-Fi connection, it has a certain impact on data transmission between the smart home device 230 and the network, and generally cannot satisfy communication requirement of smart home devices that put high requirements on delay and reliability. In order to solve the problems existing in the above-mentioned related art, the present disclosure provides a network access method, which can allow a smart home device to access a cellular mobile network.

Figure 3:
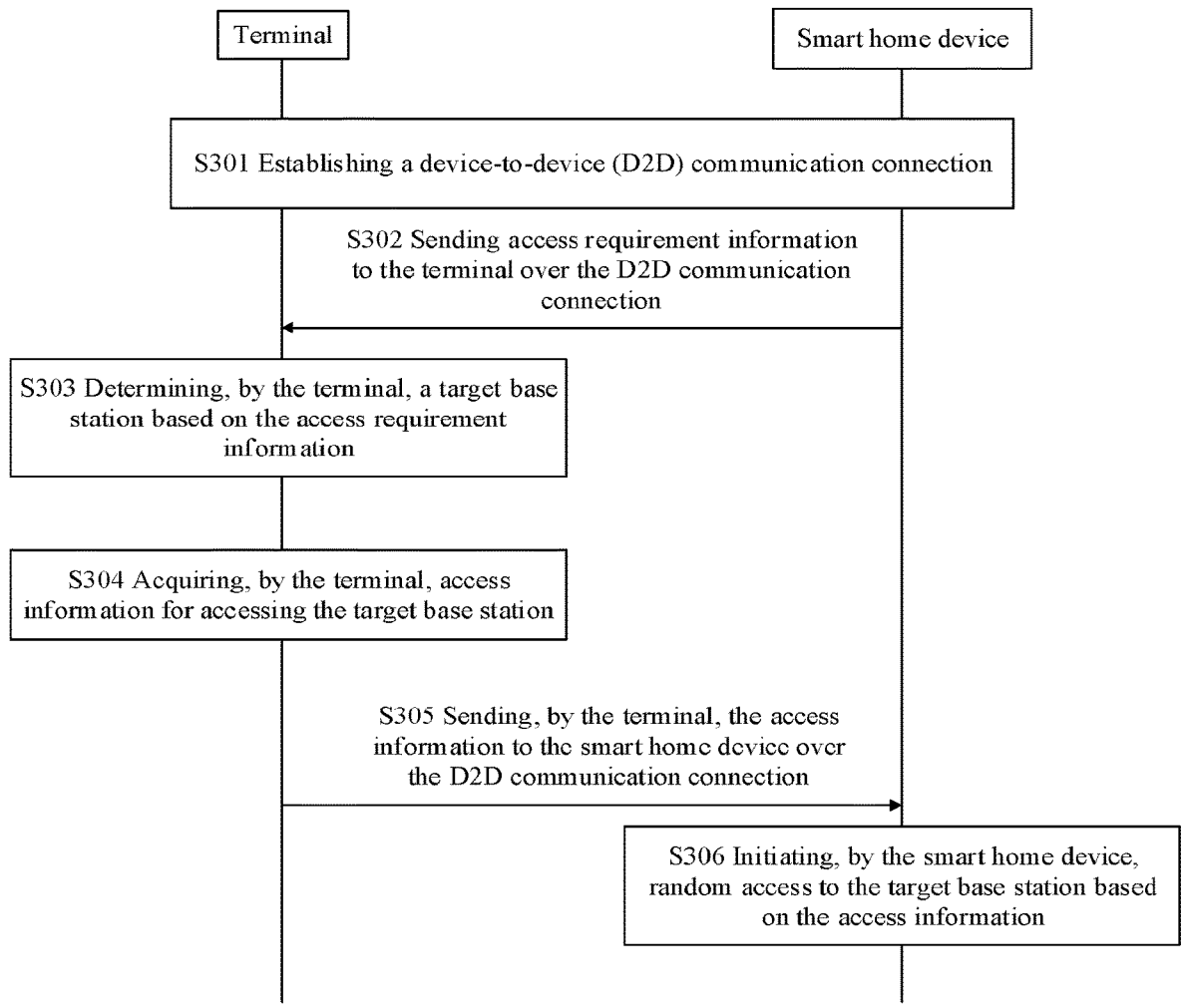
FIG. 3 is a flowchart of a network access method according to an exemplary embodiment of the present disclosure.

FIG. 3 shows a flowchart of a network access method according to an exemplary embodiment of the present disclosure. As shown in FIG. 3, the network access method may be applicable to the system structure shown in FIG. 2. The method may include the following steps.

In step 301, a device-to-device (D2D) communication connection is established between a terminal and a smart home device.

In step 302, the smart home device sends access requirement information to the terminal over the D2D communication connection. The access requirement information indicates a condition to be satisfied by a base station to be accessed by the smart home device.

In step 303, the terminal determines a target base station based on the access requirement information.

In step 304, the terminal acquires access information for accessing the target base station.

In step 305, the terminal sends the access information to the smart home device over the D2D communication connection.

In step 306, the smart home device initiates random access to the target base station based on the access information.

In summary, in response to a D2D communication connection being established between a smart home device and a terminal, the terminal receives access requirement information sent by the smart home device; the terminal determines a target base station based on the access requirement information; the terminal sends access information for accessing the target base station to the smart home device; and the smart home device initiates random access to the target base station based on the access information, such that the smart home device accesses a cellular mobile network. In the present disclosure, a terminal provides access information required for accessing a base station to a smart home device, such that the smart home device initiates random access to the base station and exchanges information with the base station over cellular mobile communication, thereby satisfying the communication needs of the smart home device.

Figure 4:
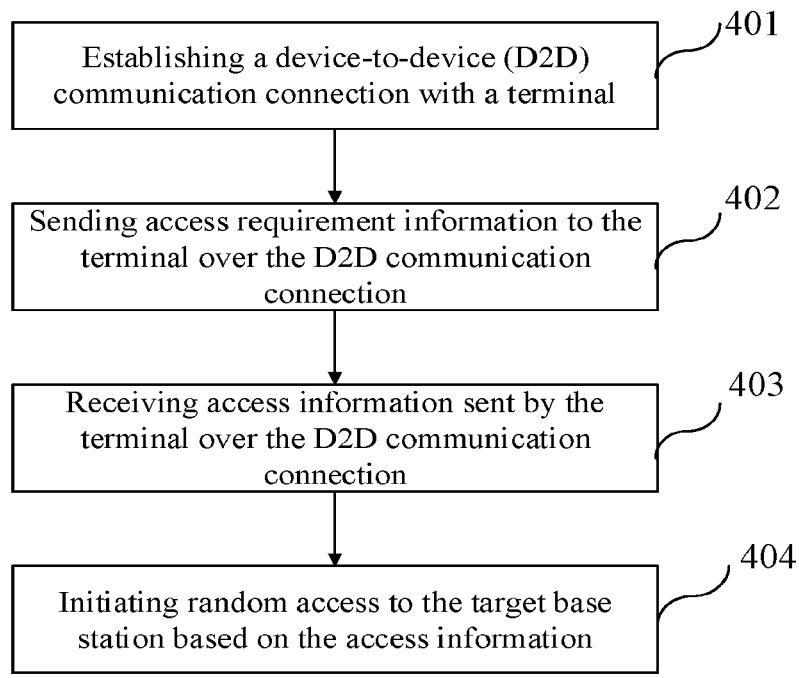
FIG. 4 is a flowchart of a network access method according to an exemplary embodiment of the present disclosure.

FIG. 4 shows a flowchart of a network access method according to an exemplary embodiment of the present disclosure. As shown in FIG. 4, the network access method may be applicable to the system shown in FIG. 2 and executed by the smart home device 230 in FIG. 2. The method may include the following steps.

In step 401, a device-to-device (D2D) communication connection is established with a terminal.

In step 402, access requirement information is sent to the terminal over the D2D communication connection. The access requirement information indicates a condition to be satisfied by a base station to be accessed by the smart home device.

In step 403, access information sent by the terminal is received over the D2D communication connection. The access information is intended for accessing a target base station, wherein the target base station is a base station determined by the terminal based on the access requirement information.

In step 404, random access is initiated to the target base station based on the access information.

Optionally, sending the access requirement information to the terminal over the D2D communication connection can include receiving an information acquisition request sent by the terminal over the D2D communication connection, and sending the access requirement information to the terminal over the D2D communication connection based on the information acquisition request. Further, the access requirement information can include at least one of the following information a service type of the smart home device, a quality of service (QoS) requirement of the smart home device, and a type of a network accessible by the smart home device.

Optionally, the access information includes a preamble for random access and a security key for establishing a connection channel with a core network, or the access information includes a preamble for random access.

In summary, in response to a D2D communication connection being established between a smart home device and a terminal, the smart home device sends access requirement information to the terminal over short-range wireless communication, and receives access information fed back by the terminal in response to the access requirement information, the smart home device initiates random access to a target base station based on the access information, such that the smart home device accesses a cellular mobile network. In the present disclosure, a terminal provides access information required for accessing a base station to a smart home device, such that the smart home device initiates random access to the base station and exchanges information with the base station over cellular mobile communication, thereby satisfying the communication needs of the smart home device.

Figure 5:
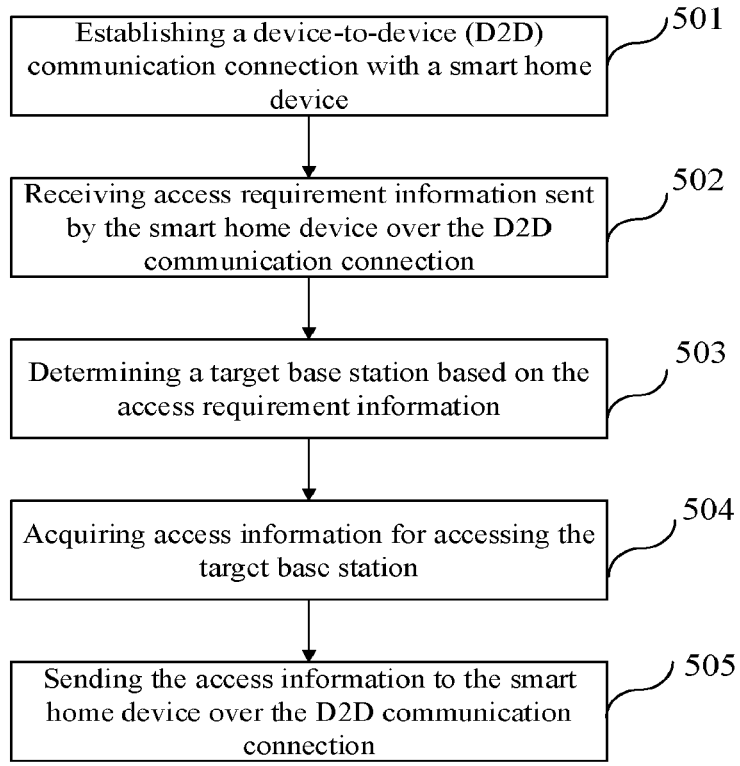
FIG. 5 is a flowchart of a network access method according to an exemplary embodiment of the present disclosure.

FIG. 5 shows a flowchart of a network access method according to an exemplary embodiment of the present disclosure. As shown in FIG. 5, the network access method may be applicable to the system shown in FIG. 2, and executed by the terminal 210 in FIG. 2. The method may include the following steps.

In step 501, a device-to-device (D2D) communication connection is established with a smart home device.

In step 502, access requirement information is received sent by the smart home device over the D2D communication connection. The access requirement information indicates a condition to be satisfied by a base station to be accessed by the smart home device.

In step 503, a target base station is determined based on the access requirement information.

In step 504, access information for accessing the target base station is acquired.

In step 505, the access information is sent to the smart home device over the D2D communication connection.

The terminal sends the access information to the smart home device, such that the smart home device may initiate random access to the target base station based on the access information.

Optionally, receiving the access requirement information sent by the smart home device over the D2D communication connection can include sending an information acquisition request to the smart home device over the D2D communication connection, and receiving access requirement information sent by the smart home device based on the information acquisition request over the D2D communication connection. Further, the access requirement information may include at least one of the following information a service type of the smart home device, a quality of service (QoS) requirement of the smart home device, and a type of a network accessible by the smart home device.

Determining the target base station based on the access requirement information can include acquiring base station information of base stations within a range of cellular mobile communication, acquiring a base station, from the base stations, of which base station information is matched with the access requirement information as a candidate base station, and determining the target base station from the candidate base stations.

When the candidate base stations include at least two base stations, determining the target base station from the candidate base stations can include determining a base station with the highest signal quality in the at least two base stations as the target base station, or acquiring a base station queue by sorting the at least two base stations in descending order of signal quality, and determining first N base stations in the base station queue as the target base stations, wherein N is an integer greater than or equal to 2.

In summary, in response to a D2D communication connection being established between a smart home device and a terminal, the terminal receives access requirement information sent by the smart home device, determines a target base station based on the access requirement information, acquires access information for accessing the target base station, and sends the access information to the smart home device, such that the smart home device initiates random access to the target base station based on the access information and accesses a cellular mobile network. In the present disclosure, a terminal provides access information required for accessing a base station to a smart home device, such that the smart home device initiates random access to the base station and exchanges information with the base station over cellular mobile communication, thereby satisfying the communication needs of the smart home device.

In a possible implementation, the above-mentioned solutions shown in FIG. 3, FIG. 4, and FIG. 5 are described in detail by connecting a smart home device to a cellular mobile network over communication between a terminal and the smart home device.

Figure 6:
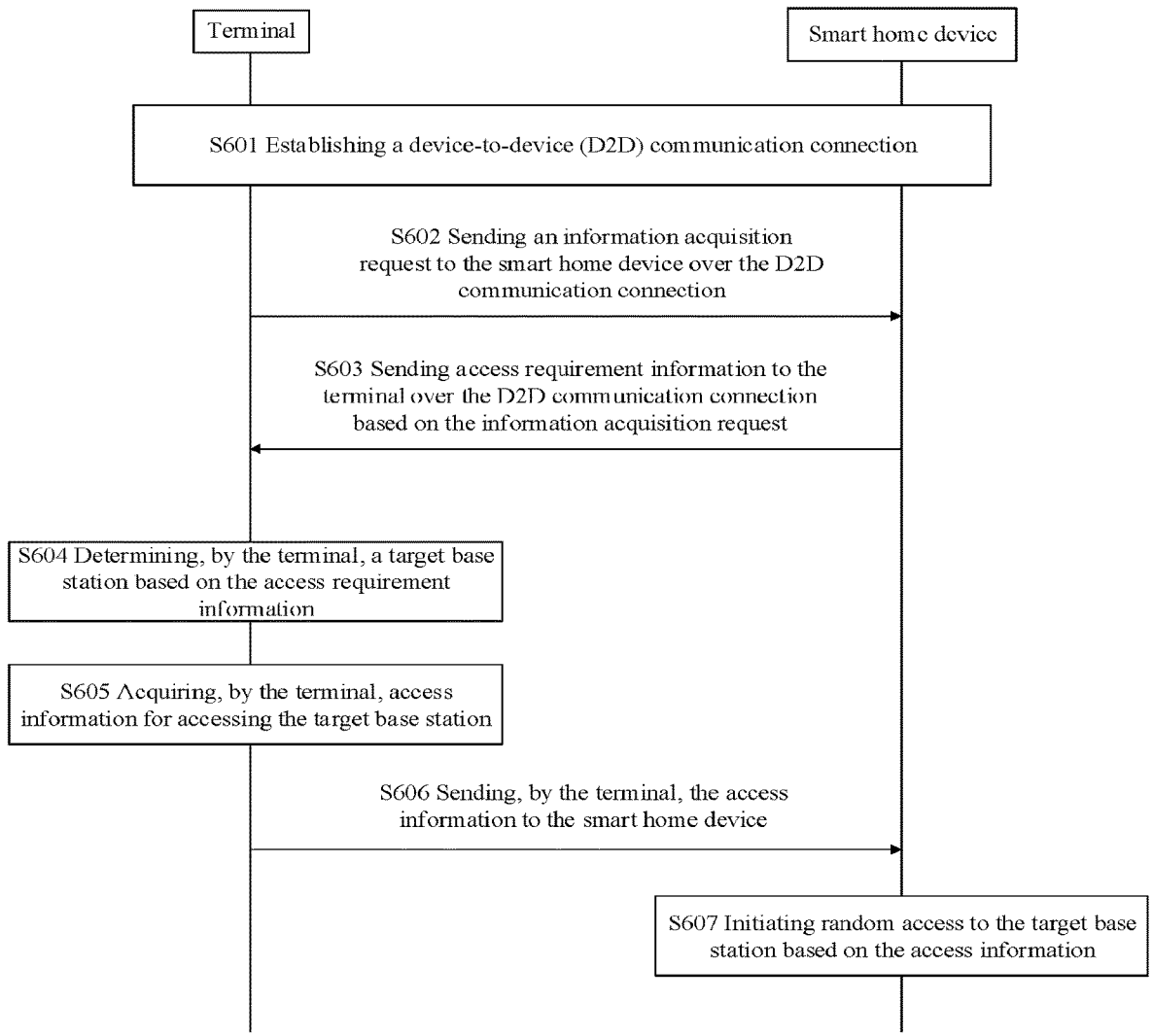
FIG. 6 is a flowchart of a network access method according to an exemplary embodiment of the present disclosure.

FIG. 6 shows a flowchart of a network access method according to an exemplary embodiment of the present disclosure. As shown in FIG. 6, the network access method may be applicable to the system shown in FIG. 2. The method may include the following steps.

In step 601, a device-to-device (D2D) communication connection is established between a terminal and a smart home device. Optionally, the D2D connection between the terminal and the smart home device may be established in a proximity discovery mode. Specifically, in a possible implementation, the smart home device periodically broadcasts a discovery message through an interface. The discovery message is used for being monitored and searched by other D2D terminals. In response to monitoring the discovery message broadcast by the smart home device, the terminal may transmit data or information to the smart home device through a corresponding interface, thereby establishing a D2D communication connection between the terminal and the smart home device.

In another possible implementation, the terminal may send a corresponding broadcast specific request through the interface. The broadcast specific request may include an ID including an adjacent application. The smart home device may monitor the broadcast specific request corresponding to its own interface through the interface. Upon receiving the broadcast specific request sent by the terminal through the corresponding interface, the smart home device sends feedback information to the terminal through the same interface as a response. The feedback information is intended for indicating that the terminal has established a D2D communication connection with the corresponding smart home device, thereby completing the D2D communication connection between the terminal and the smart appliance.

In step 602, the terminal sends an information acquisition request to the smart home device over the D2D communication connection. Correspondingly, the smart home device receives the information acquisition request sent by the terminal over the D2D communication connection. For example, in the terminal, a program instruction that may send the information acquisition request is preset, and successfully establishing the D2D connection is taken as a condition. Upon detecting that the D2D connection with the smart home device is successfully established, the terminal may be triggered to execute the program instruction, thereby sending the information acquisition request to the connected smart home device over the D2D communication connection. The preset program instruction may be set in advance by developers or operation and maintenance personnel.

In step 603, the smart home device sends access requirement information to the terminal over the D2D communication connection based on the information acquisition request. Correspondingly, the terminal receives the access requirement information sent by the smart home device based on the information acquisition request over the D2D communication connection. The access requirement information indicates a condition to be satisfied by a base station to be accessed by the smart home device.

Optionally, when receiving the information acquisition request, the smart home device sends an access information acquisition request to the terminal. The access information acquisition request includes the access requirement information. Specifically, in a possible implementation, when receiving the information acquisition request, the smart home device may send the access requirement information to the connected terminal over the D2D communication connection. The access requirement information can include at least one of the following information: a service type of the smart home device, a quality of service (QoS) requirement of the smart home device, and a type of a network accessible by the smart home device.

The service type may be classified according to the type of data transmitted by the smart home device and the network side. For example, the above-mentioned service type may be classified into a video surveillance service, a voice transmission service, a smart scene control service, and the like. Alternatively, the service type may also be classified according to interaction requirements of information interaction between the smart home device and the network side. For example, the above-mentioned service type may be classified into a first type of service requiring high-speed data transmission, a second type of service requiring high-reliability transmission, and a third type of service requiring low-latency transmission and the like.

Optionally, the above-mentioned type of network that may be accessed by the smart home device may be classified according to application scenarios. For example, the above-mentioned type of network that may be accessed by the smart home device may be classified into a first type of network suitable for an enhanced mobile broadband (EMBB) scene, a second type of network suitable for a massive machine type of communication (mMTC) scene, and a third type of network suitable for an ultra-reliable & low-latency communication scene and the like.

For example, in the smart home device, a program instruction that may send access requirement information of the smart home device is preset, and receiving the information acquisition request is taken as a condition. When receiving the information acquisition request, the smart home device may be triggered to execute the program instruction, thereby sending the access requirement information of the smart home device to the connected terminal over the D2D communication connection. The preset program instruction may be set in advance by developers or operation and maintenance personnel.

Of course, the above-mentioned access requirement information may also include information such as an identification of the smart home device, connection verification information, a type of the smart home device, and a communication capability of the smart home device and the like.

In step 604, the terminal determines a target base station based on the access requirement information. Optionally, the terminal acquires base station information of base stations within a range of cellular mobile communication, acquire a base station, from the base stations, of which base station information is matched with the access requirement information as a candidate base station, and determine the target base station from the candidate base stations.

The terminal may perform cell synchronization with surrounding base stations, and in response to successful synchronization, acquire information carried in a master information block (MIB) and/or at least one system information block (SIB) in a signal sent by each base station, and acquire the above-mentioned base station information based on the acquired information. Optionally, the base station information may include, but is not limited to, a cell identification of the base station, a type of service that the base station can provide, QoS requirements that the base station can meet, a network type to which the base station belongs, and the like.

In a possible implementation, taking the access requirement information sent by the smart appliance including the service type of the smart home device as an example, in response to receiving the access requirement information sent by the smart home device, the terminal acquires base station information of base stations within the range of cellular mobile communication, screens the base stations based on the base station information of the base stations to obtain base stations that can provide services corresponding to the service type of the smart home device, determines the obtained base stations as candidate base stations, and determines the target base station from the candidate base stations.

In another possible implementation, taking the access requirement information sent by the smart home device including the QoS requirements of the smart home device as an example, upon receiving the QoS requirements sent by the smart home device, the terminal acquires base station information of base stations within the range of cellular mobile communication, screens the base stations based on the base station information of the base stations to obtain base stations that can meet the QoS requirements of the smart home device, determines the obtained base stations as candidate base stations, and determines the target base station from the candidate base stations.

Alternatively, in another possible implementation, taking the access requirement information sent by the smart appliance including the type of the network accessible by the smart home device as an example, upon receiving the access requirement information sent by the smart home device, the terminal acquires base station information of base stations within the range of cellular mobile communication, screens the base stations based on the base station information of the base stations to obtain base stations with the same network type as the network that may be accessed by smart home device, determines the obtained base stations as candidate base stations, and determines the target base station from the candidate base stations.

Optionally, when the above-mentioned access requirement information includes two or all three of the service type of the smart home device, the QoS requirements of the smart home device, and the type of the network accessible by the smart home device, the terminal may determine a base station that meets the above two or all three conditions simultaneously as a candidate base station.

When the candidate base stations include at least two base stations, determining the target base station from the candidate base stations can include determining a base station with the highest signal quality in the at least two base stations as the target base station, alternatively, acquiring base station queue by sorting the at least two base stations in descending order of signal quality, and determining first N base stations in the base station queue as the target base stations, wherein N is an integer greater than or equal to 2.

Specifically, taking the selection condition being the signal quality of the base station as an example, when the above-mentioned candidate base stations include at least two base stations, the terminal may screen out a base station with the highest signal quality based on the base station signal quality contained in the detected base station information and determine the same as the target base station. In another possible implementation, the number of target base stations screened by the terminal is N, wherein N is an integer greater than or equal to 2. The terminal may sort the candidate base stations in an order of signal quality from high to low, so as to acquire a base station queue, and determine first N base stations in the base station queue as the target base stations. N may be preset by developers or operation and maintenance personnel.

In step 605, the terminal acquires access information intended to access the target base station. Optionally, the access information includes a preamble for random access, or the access information includes a preamble for random access and a security key for establishing a connection channel with a core network.

In step 606, the terminal sends the access information to the smart home device over a short-range wireless communication connection.

In step 607, the smart home device initiates random access to the target base station based on the access information.

Specifically, upon determining the target base station, the terminal may acquire access information for accessing the target base station. In a possible implementation, taking the acquired access information being the preamble for random access as an example, when the random access is a non-contention access, the preamble for random access is allocated by the target base station. The terminal may acquire the preamble allocated by the target base station and send the preamble to the smart home device over the short-range wireless communication connection. Upon receiving the preamble, the smart home device may automatically initiate random access to the target base station. The subsequent process of the base station responding and completing random access is similar to the process of non-contention random access in FIG. 1, which will not be repeated here. Of course, when there are N target base stations, the terminal may acquire preambles randomly allocated by a plurality of target base stations, and send these preambles to the smart home device. When receiving a plurality of preambles, the smart home device selects one of the preambles to initiate random access to a corresponding target base station, and stores the remaining preambles for subsequent use in situations where connections are failed or other situations where re-access is required.

When the random access is a contention access, the preamble for random access is a preamble randomly selected by the terminal from a preamble resource pool. In this case, the terminal sends the acquired preamble to the smart home device. Upon acquiring the preamble and the security key carried in the access information, the smart home device initiates random access to the target base station according to the steps of contention access. Similarly, the subsequent process of the base station responding and completing random access is similar to the contention random access process in FIG. 1, which will not be repeated here.

When the above-mentioned access information includes the security key for establishing the connection channel with the core network, the smart home device may also establish a connection channel with the core network based on the security key.

In summary, in response to the short-range communication connection being established between the smart home device and the terminal, the terminal receives the access requirement information sent by the smart home device; the terminal determines the target base station based on the access requirement information; the terminal sends the access information for accessing the target base station to the smart home device; and the smart home device initiates random access to the target base station based on the access information, such that the smart home device accesses the cellular mobile network. In the present disclosure, the terminal provides access information required for accessing the base station to the smart home device, such that the smart home device initiates random access to the base station and exchanges information with the base station over cellular mobile communication, thereby satisfying the communication needs of the smart home device.

Figure 7:
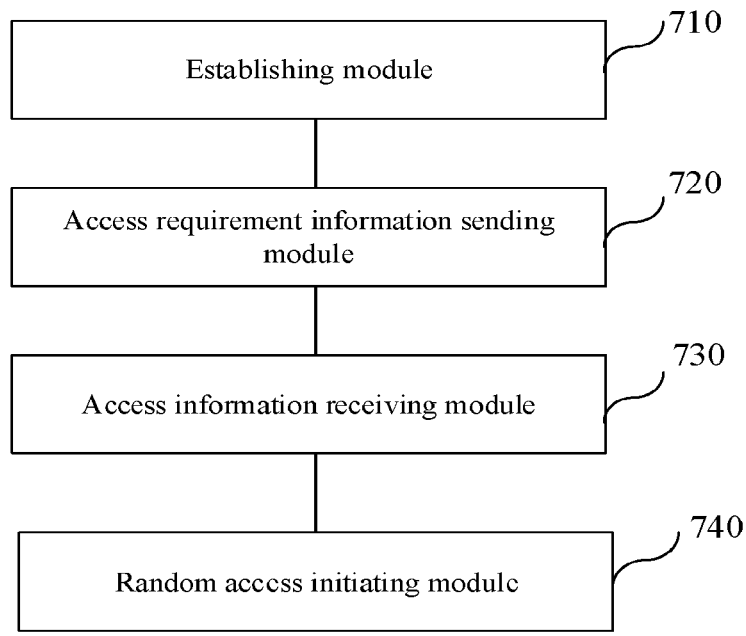
FIG. 7 is a block diagram of a network access apparatus according to an exemplary embodiment of the present disclosure.

FIG. 7 shows a block diagram of a network access apparatus according to an exemplary embodiment of the present disclosure. As shown in FIG. 7, the network access apparatus may realize part or all of the smart home device in the implementation environment shown in FIG. 2 by software, hardware or a combination of both, so as to perform the steps performed by the smart home device in any of the embodiments shown in FIG. 4 or FIG. 6. Further, it should be understood that one or more of the modules described in this disclosure can be implemented by hardware, such as circuitry.

The network access apparatus may include an establishing module 710 that is configured to establish a device-to-device (D2D) communication connection with a terminal, and an access requirement information sending module 720, configured to send access requirement information to the terminal over the D2D communication connection. The access requirement information indicates a condition to be satisfied by a base station to be accessed by the smart home device. The apparatus can further include an access information receiving module 730 that is configured to receive access information sent by the terminal over the D2D communication connection, wherein the access information is intended for accessing a target base station, the target base station being a base station determined by the terminal based on the access requirement information, and a random access initiating module 740 that is configured to initiate random access to the target base station based on the access information.

Optionally, the access requirement information sending module 720 is specifically configured to receive an information acquisition request sent by the terminal over the D2D communication connection, and send the access requirement information to the terminal over the D2D communication connection based on the information acquisition request.

Optionally, the access requirement information includes at least one of the following information a service type of the smart home device, a quality of service (QoS) requirement of the smart home device, and a type of a network accessible by the smart home device.

Optionally, the access information includes a preamble for random access and a security key for establishing a connection channel with a core network or the access information includes a preamble for random access.

Figure 8:
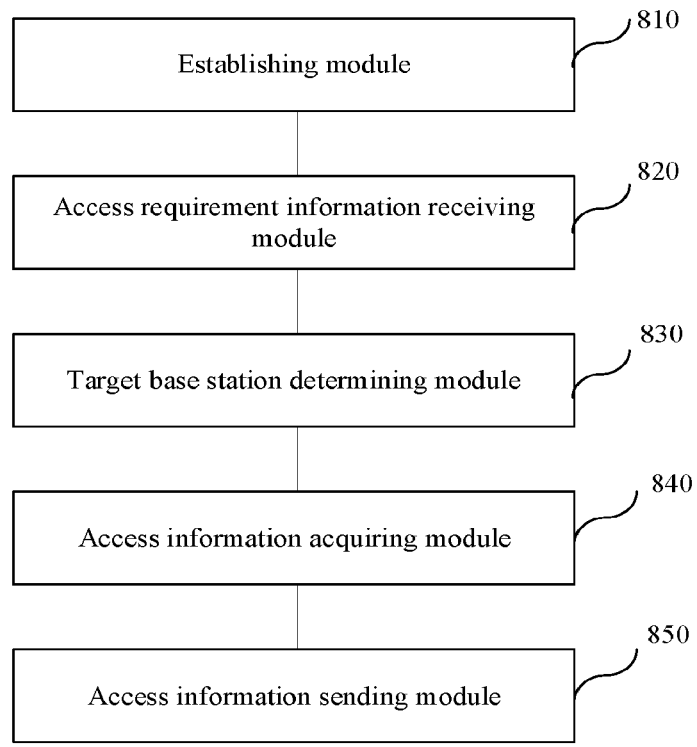
FIG. 8 is a block diagram of a network access apparatus according to an exemplary embodiment of the present disclosure.

FIG. 8 shows a block diagram of a network access apparatus according to an exemplary embodiment of the present disclosure. As shown in FIG. 8, the network access device may realize part or all of the terminal in the implementation environment shown in FIG. 2 by software, hardware or a combination of both, so as to perform the steps performed by the terminal in any of the embodiments shown in FIG. 5 or FIG. 6. The network access apparatus may include an establishing module 810 that is configured to establish a device-to-device (D2D) communication connection with a smart home device, and an access requirement information receiving module 820 that is configured to receive access requirement information sent by the smart home device over the D2D communication connection, wherein the access requirement information indicates a condition to be satisfied by a base station to be accessed by the smart home device. The apparatus can further include a target base station determining module 830 that is configured to determine a target base station based on the access requirement information, an access information acquiring module 840, configured to acquire access information for accessing the target base station, and an access information sending module 850, configured to send the access information to the smart home device over the D2D communication connection, such that the smart home device initiates random access to the target base station based on the access information.

Optionally, the access requirement information receiving module can be configured to send an information acquisition request to the smart home device over the D2D communication connection, and receive the access requirement information sent by the smart home device based on the information acquisition request over the D2D communication connection.

Optionally, the access requirement information includes at least one of the following information a service type of the smart home device, a quality of service (QoS) requirement of the smart home device, and a type of a network accessible by the smart home device.

The target base station determining module 830 can be configured to acquire base station information of base stations within a range of cellular mobile communication, acquire a base station, from the base stations, of which base station information is matched with the access requirement information as a candidate base station, and determine the target base station from the candidate base stations.

Optionally, when the candidate base stations include at least two base stations, the target base station determining module 830 can be configured to determine a base station with the highest signal quality in the at least two base stations as the target base station, or acquiring a base station queue by sorting the at least two base stations in descending order of signal quality, and determine first N base stations in the base station queue as the target base stations, wherein N is an integer greater than or equal to 2.

It should be noted that, when the apparatus according to the above-mentioned embodiment realizes its functions, only the division of the above-mentioned functional modules is used as an example for illustration. In practice, the above-mentioned functions may be allocated to different functional modules to complete according to actual needs. That is, the content structure of the apparatus is divided into different functional modules to complete all or part of the functions described above.

Regarding the apparatus in the above-mentioned embodiments, the specific manner in which each module performs operations has been described in detail in the embodiments of the method, and will not be described in detailed here.

An embodiment of the present disclosure also provides a network access system. The system includes a smart home device and a terminal, wherein the smart home device includes the network access apparatus shown in FIG. 7, and the terminal includes the network access apparatus shown in FIG. 8.

An exemplary embodiment of the present disclosure also provides a cellular mobile network access device, which may perform all or part of the steps performed by the smart home device in the embodiments shown in FIG. 3, FIG. 4, or FIG. 6. The cellular mobile network access device includes a processor and a memory for storing instructions executable by the processor.

The processor can be configured to establish a device-to-device (D2D) communication connection with a terminal, and send access requirement information to the terminal over the D2D communication connection, wherein the access requirement information indicates a condition to be satisfied by a base station to be accessed by a smart home device. The processor can be further configured to receive access information sent by the terminal over the D2D communication connection, wherein the access information is intended for accessing a target base station, the target base station being a base station determined by the terminal based on the access requirement information, and initiate random access to the target base station based on the access information.

Optionally, sending the access requirement information to the terminal over the D2D communication connection includes receiving an information acquisition request sent by the terminal over the D2D communication connection, and sending the access requirement information to the terminal over the D2D communication connection based on the information acquisition request. The access requirement information can include at least one of the following information a service type of the smart home device, a quality of service (QoS) requirement of the smart home device, and a type of a network accessible by the smart home device.

Further, the access information can include a preamble for random access and a security key for establishing a connection channel with a core network, or the access information includes a preamble for random access.

An exemplary embodiment of the present disclosure also provides a cellular mobile network access device, which may perform all or part of the steps performed by the terminal in the embodiments shown in FIG. 3, FIG. 5, or FIG. 6. The cellular mobile network access device includes a processor and a memory for storing instructions executable by the processor.

The processor is configured to establish a device-to-device (D2D) communication connection with a smart home device, receive access requirement information sent by the smart home device over the D2D communication connection, wherein the access requirement information indicates a condition to be satisfied by a base station to be accessed by the smart home device, determine a target base station based on the access requirement information, acquire access information for accessing the target base station, and send the access information to the smart home device over the D2D communication connection, such that the smart home device initiates random access to the target base station based on the access information.

Optionally, receiving the access requirement information sent by the smart home device over the D2D communication connection can include sending an information acquisition request to the smart home device over the D2D communication connection, and receiving the access requirement information sent by the smart home device based on the information acquisition request over the D2D communication connection. Further, the access requirement information includes at least one of the following information a service type of the smart home device, a quality of service (QoS) requirement of the smart home device, and a type of a network accessible by the smart home device.

Optionally, determining the target base station based on the access requirement information includes acquiring base station information of base stations within a range of cellular mobile communication, acquiring a base station, from the base stations, of which base station information is matched with the access requirement information as a candidate base station, and determining the target base station from the candidate base stations.

Optionally, when the candidate base stations include at least two base stations, determining the target base station from the candidate base stations includes determining a base station with the highest signal quality in the at least two base stations as the target base station, or acquiring a base station queue by sorting the at least two base stations in descending order of signal quality, and determining first N base stations in the base station queue as the target base stations, wherein N is an integer greater than or equal to 2.

The solutions according to the embodiments of the present disclosure are introduced by mainly taking a terminal and a server as examples in the above. It should be understood that, in order to implement the above-mentioned functions, the terminal and the server include hardware structures and/or software modules for performing corresponding functions. In combination with the modules and algorithm steps of the examples described in the embodiments of the present disclosure, the embodiments of the present disclosure may be implemented in the form of hardware or a combination of hardware and computer software. Whether a function is performed by hardware or computer software-driven hardware depends on the specific application and design constraints of the technical solution. Those skilled in the art may use different methods for each specific application to implement the described functions, but such implementation should not be considered as going beyond the scope of the technical solutions according to the embodiments of the present disclosure.

Figure 9:
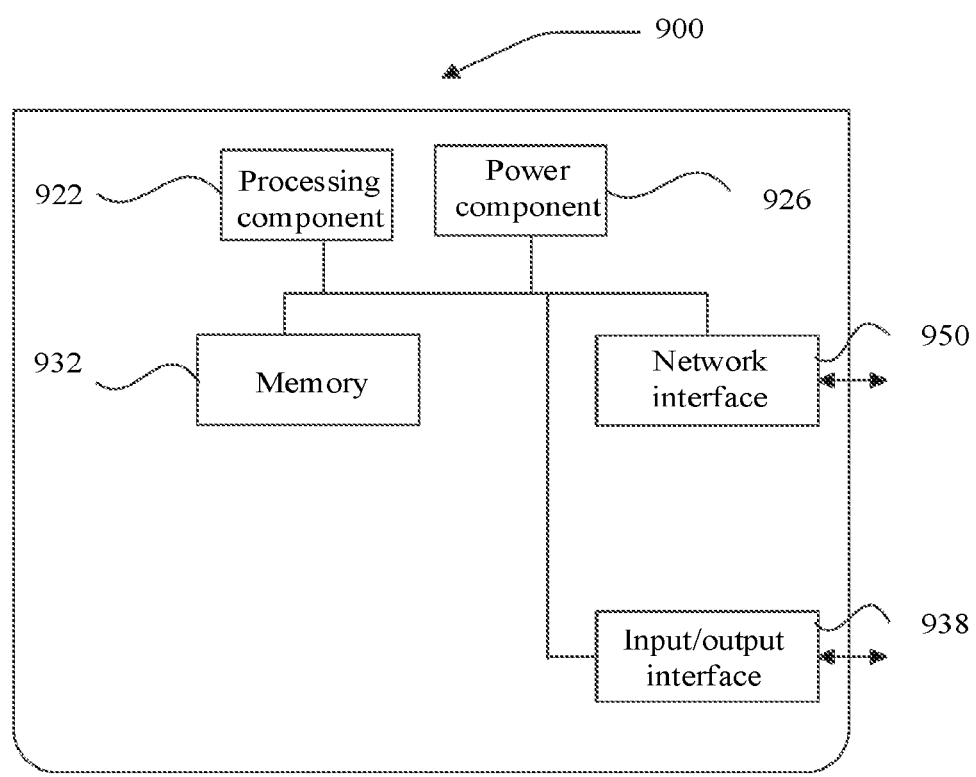
FIG. 9 is a block diagram of a network access device according to an exemplary embodiment of the present disclosure.

FIG. 9 is a block diagram of a device 900 for cellular mobile network access according to an exemplary embodiment of the present disclosure. For example, the device 900 may be provided as a terminal or a smart home device. Referring to FIG. 9, the device 900 includes a processing component 922, which may further include one or more processors, and memory resources represented by a memory 932, for storing instructions executable by the processing component 922, such as application programs. The application programs stored in the memory 932 may include one or more modules each corresponding to a set of instructions. In addition, the processing component 922 is configured to execute instructions to perform all or part of the steps performed by the terminal or the smart home device in the above-mentioned network access method.

The device 900 may also include a power component 926 configured to perform power management of the device 900, a wired or wireless network interface 950 configured to connect the device 900 to a network, and an input and output (I/O) interface 938. The device 900 may operate based on an operating system stored in the memory 932, such as Windows Server™, Mac OS X™, Unix™, Linux™, FreeBSD™, or the like.

Those skilled in the art should be aware that in one or more of the above-mentioned examples, the functions described in the embodiments of the present disclosure may be implemented by hardware, software, firmware, or any combination thereof. When implemented by software, these functions may be stored in a non-transitory computer-readable medium or transmitted as one or more instructions or codes on the computer-readable medium. The computer-readable medium includes a computer storage medium and a communication medium. The communication medium includes any medium that facilitates the transfer of a computer program from one place to another. The storage medium may be any available medium that may be accessed by a general-purpose or special-purpose computer.

An embodiment of the present disclosure also provides a computer storage medium for storing computer software instructions used for the above-mentioned terminal or smart home device, which may include a program designed for performing the above-mentioned network access method.

After considering the specification and practicing the present disclosure, those skilled in the art will easily think of other embodiments of the present disclosure. The present disclosure is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are defined by the appended claims.

It should be understood that the present disclosure is not limited to the precise structure described above and shown in the drawings, and various modifications and changes may be made without departing from its scope. The scope of the present disclosure is only limited by the appended claims.

What is claimed is:

1. A network access method, comprising:
   establishing a device-to-device (D2D) communication connection between a terminal and a smart home device;
   sending, by the smart home device, access requirement information to the terminal over the D2D communication connection, the access requirement information indicating a condition to be satisfied by a base station to be accessed by the smart home device;
   determining, by the terminal, a target base station based on the access requirement information;
   acquiring, by the terminal, access information for accessing the target base station;
   sending, by the terminal, the access information to the smart home device over the D2D communication connection; and
   initiating, by the smart home device, random access to the target base station based on the access information.

2. A network access method that is performed by a smart home device, the method comprising:
   establishing a device-to-device (D2D) communication connection with a terminal;
   sending access requirement information to the terminal over the D2D communication connection, the access requirement information indicating a condition to be satisfied by a base station to be accessed by the smart home device;
   receiving access information from the terminal over the D2D communication connection, the access information being intended for accessing a target base station that is a base station determined by the terminal based on the access requirement information; and
   initiating random access to the target base station based on the access information.

3. The method according to claim 2, wherein sending the access requirement information to the terminal over the D2D communication connection further comprises:
   receiving an information acquisition request from the terminal over the D2D communication connection; and
   sending the access requirement information to the terminal over the D2D communication connection based on the information acquisition request.

4. The method according to claim 2, wherein the access requirement information comprises at least one of:
   a service type of the smart home device, a quality of service (QoS) requirement of the smart home device, or a type of a network accessible by the smart home device.

5. The method according to claim 2, wherein:
   the access information includes a preamble for random access and a security key for establishing a connection channel with a core network, or
   the access information includes a preamble for random access.

6. A network access method, that is performed by a terminal, the method comprising:
   establishing a device-to-device (D2D) communication connection with a smart home device;
   receiving access requirement information from the smart home device over the D2D communication connection, the access requirement information indicating a condition to be satisfied by a base station to be accessed by the smart home device;
   determining a target base station based on the access requirement information;
   acquiring access information for accessing the target base station; and
   sending the access information to the smart home device over the D2D communication connection, such that the smart home device initiates random access to the target base station based on the access information.

7. The method according to claim 6, wherein receiving the access requirement information from the smart home device over the D2D communication connection further comprises:
   sending an information acquisition request to the smart home device over the D2D communication connection; and
   receiving the access requirement information from the smart home device based on the information acquisition request over the D2D communication connection.

8. The method according to claim 6, wherein the access requirement information comprises at least one of:
   a service type of the smart home device, a quality of service (QoS) requirement of the smart home device, and a type of a network accessible by the smart home device.

9. The method according to claim 6, wherein determining the target base station based on the access requirement information further comprises:
   acquiring base station information of base stations within a range of cellular mobile communication;
   acquiring a base station, from the base stations, of which base station information is matched with the access requirement information as a candidate base station; and
   determining the target base station from the candidate base stations.

10. The method according to claim 9, wherein when the candidate base stations include at least two base stations, determining the target base station from the candidate base stations further comprises:
   determining a base station with the highest signal quality in the at least two base stations as the target base station, or
   acquiring a base station queue by sorting the at least two base stations in descending order of signal quality, and determining first N base stations in the base station queue as the target base stations, where N is an integer greater than or equal to 2.

11. A network access apparatus comprising:
a processor; and
a memory for storing at least one instruction executable by the processor,
wherein, when the at least one instruction is executed by the processor, the processor performs the network access method recited in claim 2.

12. The apparatus according to claim 11, wherein sending the access requirement information to the terminal over the D2D communication connection further comprises:
receiving an information acquisition request from the terminal over the D2D communication connection; and
sending the access requirement information to the terminal over the D2D communication connection based on the information acquisition request.

13. The apparatus according to claim 11, wherein the access requirement information comprises at least one of:
a service type of the smart home device, a quality of service (QoS) requirement of the smart home device, and a type of a network accessible by the smart home device.

14. The apparatus according to claim 11, wherein:
the access information includes a preamble for random access and a security key for establishing a connection channel with a core network, or
the access information includes a preamble for random access.

15. A network access apparatus comprising:
a processor; and
a memory for storing at least one instruction executable by the processor,
wherein, when the at least one instruction is executed by the processor, the processor performs the network access method recited in claim 6.

16. The apparatus according to claim 15, wherein receiving the access requirement information sent from the smart home device over the D2D communication connection further comprises:
sending an information acquisition request to the smart home device over the D2D communication connection; and
receiving the access requirement information from the smart home device based on the information acquisition request over the D2D communication connection.

17. The apparatus according to claim 15, wherein the access requirement information comprises at least one of:
a service type of the smart home device, a quality of service (QoS) requirement of the smart home device, and a type of a network accessible by the smart home device.

18. The apparatus according to claim 15, wherein determining the target base station based on the access requirement information further comprises:
acquiring base station information of base stations within a range of cellular mobile communication;
acquiring a base station, from the base stations, of which base station information is matched with the access requirement information as a candidate base station; and
determining the target base station from the candidate base stations.

19. The apparatus according to claim 18, wherein, when the candidate base stations include at least two base stations, determining the target base station from the candidate base stations further comprises:
determining a base station with a highest signal quality in the at least two base stations as the target base station; or
acquiring a base station queue by sorting the at least two base stations in descending order of signal quality, and determining first N base stations in the base station queue as the target base stations, where N is an integer greater than or equal to 2.

20. A network access system having a smart home device and a terminal,
the smart home device including a network access apparatus comprising:
a processor; and
a memory for storing at least one instruction executable by the processor;
wherein, when the at least one instruction is executed by the processor, the processor performs a network access method comprising:
establishing a device-to-device (D2D) communication connection with a terminal,
sending access requirement information to the terminal over the D2D communication connection, the access requirement information indicating a condition to be satisfied by a base station to be accessed by the smart home device,
receiving access information from the terminal over the D2D communication connection, the access information being intended for accessing a target base station, the target base station being a base station determined by the terminal based on the access requirement information, and
initiating random access to the target base station based on the access information; and
the terminal includes the network access apparatus recited in claim 15.

* * * * *